United States Patent
Carlisle

(10) Patent No.: US 8,351,330 B2
(45) Date of Patent: Jan. 8, 2013

(54) SYSTEM AND METHOD FOR TRAFFIC PRIORITIZATION

(75) Inventor: Matthew Carlisle, Sammamish, WA (US)

(73) Assignee: Novatel Wireless, Inc., San Diego, CA (US)

( * ) Notice: Subject to any disclaimer, the term of this patent is extended or adjusted under 35 U.S.C. 154(b) by 29 days.

(21) Appl. No.: 12/372,682

(22) Filed: Feb. 17, 2009

(65) Prior Publication Data

US 2009/0232017 A1   Sep. 17, 2009

Related U.S. Application Data

(60) Provisional application No. 61/030,130, filed on Feb. 20, 2008.

(51) Int. Cl.
*H04J 3/14* (2006.01)
(52) U.S. Cl. ...................................................... 370/232
(58) Field of Classification Search .................. 370/230, 370/230.1, 231, 232, 233, 234, 235, 234.1
See application file for complete search history.

(56) References Cited

U.S. PATENT DOCUMENTS

| | | | | |
|---|---|---|---|---|
| 6,263,451 B1 * | 7/2001 | Cheng | ........................... | 713/600 |
| 6,434,124 B1 * | 8/2002 | Rege | ............................ | 370/311 |
| 6,546,017 B1 * | 4/2003 | Khaunte | ........................ | 370/412 |
| 6,914,881 B1 * | 7/2005 | Mansfield et al. | ............. | 370/230 |
| 6,931,003 B2 | 8/2005 | Anderson | | |
| 6,956,818 B1 * | 10/2005 | Thodiyil | ......................... | 370/230 |
| 2002/0057706 A1 * | 5/2002 | Michiel | .......................... | 370/412 |
| 2002/0178282 A1 * | 11/2002 | Mysore et al. | ................. | 709/234 |
| 2003/0081545 A1 * | 5/2003 | Goetzinger et al. | ........... | 370/229 |
| 2007/0183320 A1 * | 8/2007 | Chen et al. | ...................... | 370/229 |
| 2010/0098003 A1 * | 4/2010 | Randall et al. | ................. | 370/329 |

OTHER PUBLICATIONS

PCT Search Report for PCT Application No. PCT/US2009/034321 mailed Apr. 30, 2009.

* cited by examiner

*Primary Examiner* — Andrew Lai
*Assistant Examiner* — Juvena Loo
(74) *Attorney, Agent, or Firm* — AlbertDhand LLP

(57) ABSTRACT

A method for management of Internet Protocol (IP) traffic comprises (a) receiving an uplink data packet associated with a connection of a plurality of connections; (b) assigning a weight to the uplink data packet; (c) updating a debt associated with the connection based on the weight assigned to the uplink data packet; (d) prioritizing the connections based on the debt associated with each of the one or more connections; and (e) processing packets in the one or more connections based on the prioritizing.

3 Claims, 4 Drawing Sheets

Stream 1

Stream 2

Stream 3

SYSTEM AND METHOD FOR TRAFFIC PRIORITIZATION

RELATED APPLICATIONS

This application claims the benefit of priority under 35 U.S.C. §119(e) to U.S. Provisional Patent Application No. 61/030,130, filed Feb. 20, 2008.

FIELD OF THE INVENTION

The present invention relates generally to the field of wireless communication. In particular, the present invention relates to traffic management during uploading and/or downloading of data through wireless communication.

BACKGROUND OF THE INVENTION

Conventional network technologies implement products with prioritization models for WAN networks. However, with emerging broadband-like wireless networks, such as Evolution-Data Optimized (EVDO) Rev A and High-Speed Downlink Packet Access (HSDPA), a new approach to providing faster and more efficient downloading and uploading through such prioritization models is also becoming necessary. Typically, existing asymmetric networks download speed is much higher than the upload speed since more bandwidth is provided for downloads. However, in practice, most networks have download speeds that progressively suffer as the upload latency increases. This may result from the utilization of the upload channel by the download channel.

Characteristically, this results in dramatically slower downloads while an upload is occurring and slower connection establishment for the purpose of initiating those downloads. This may be the result of usage of a first-in-first-out (FIFO) queue in the modem. In certain circumstances, an upload of much larger bandwidth usage must complete before a smaller download may be pushed through the queue. Both the FIFO queue and large receive windows may delay the transmission of the "acknowledgement" packets to the sender of the data.

These acknowledgement packets, called TCP Acknowledgments, which allow for additional packets to be sent by the sender, maintain the downloads. The result is that the download speed converges towards the upload speed, and overall throughput (downloading and uploading) is thereby reduced.

SUMMARY OF THE INVENTION

In one aspect of the invention, a method for management of Internet Protocol (IP) traffic comprises (a) receiving an uplink data packet associated with a connection of a plurality of connections; (b) assigning a weight to the uplink data packet; (c) updating a debt associated with the connection based on the weight assigned to the uplink data packet; (d) prioritizing the connections based on the debt associated with each of the one or more connections; and (e) processing packets in the one or more connections based on the prioritizing.

In one embodiment, the weight assigned to the uplink data packet is based on a size of the uplink data packet. The weight assigned to the uplink data packet may be determined by dividing the size of the uplink data packet by a priority strength coefficient. The priority strength coefficient may be configurable. In one embodiment, a larger size of the uplink data packet is associated with a larger weight.

In one embodiment, the updating the debt associated with the connection includes adding the weight of the packet to an existing debt.

In one embodiment, the prioritizing includes assigning a higher priority to connections with lower debt.

In one embodiment, the method further comprises repeating steps (a)-(e) for each additional packet received.

In one embodiment, the method further comprises reducing the debt associated with each of the one or more connections on a periodic basis. An amount of reduction in the debt may be predetermined. A periodicity of reduction in the debt may be predetermined. In one embodiment, an amount of reduction varies dynamically based on network conditions. The network conditions may include current uplink throughput.

In one embodiment, the method further comprises updating a list of connections when a new connection is established or when an existing connection is terminated.

In another aspect, the invention relates to a device comprising a processor and a memory unit communicatively connected to the processor. The memory unit includes (a) computer code for receiving an uplink data packet associated with a connection of one or more connections; (b) computer code for assigning a weight to the uplink data packet; (c) computer code for updating a debt associated with the connection based on the weight assigned to the uplink data packet; (d) computer code for prioritizing the connections based on the debt associated with each of the one or more connections; and (e) computer code for processing packets in the one or more connections based on the prioritizing.

In another aspect, the invention relates to a computer program product, embodied on a computer-readable medium, comprising (a) computer code for receiving an uplink data packet associated with a connection of one or more connections; (b) computer code for assigning a weight to the uplink data packet; (c) computer code for updating a debt associated with the connection based on the weight assigned to the uplink data packet; (d) computer code for prioritizing the connections based on the debt associated with each of the one or more connections; and (e) computer code for processing packets in the one or more connections based on the prioritizing.

These and other advantages and features of various embodiments of the present invention, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Embodiments of the present invention allow for an increase in upload and download speeds by weighting the connections (e.g., uplinks) and prioritizing uploads according to their weighting. Thus, downloads are continued at a higher speeds, while only minimally affecting the upload speed, and the overall throughput of the network is improved.

Embodiments of the present invention provide for an apparatus, method and computer program product for improving download speeds and decreasing upload latency in networks, particularly wireless wide area networks. In accordance with various embodiments of the present invention, these improvements may be achieved through a network accelerator that may be implemented within a router or modem, for example. The accelerator may be configured to manipulate the entries of data into the queue through prioritization in order to push through uploads and downloads by faster receipt of acknowledgement packets. Thus, overall latency of the traffic is substantially minimized.

Figure 1:
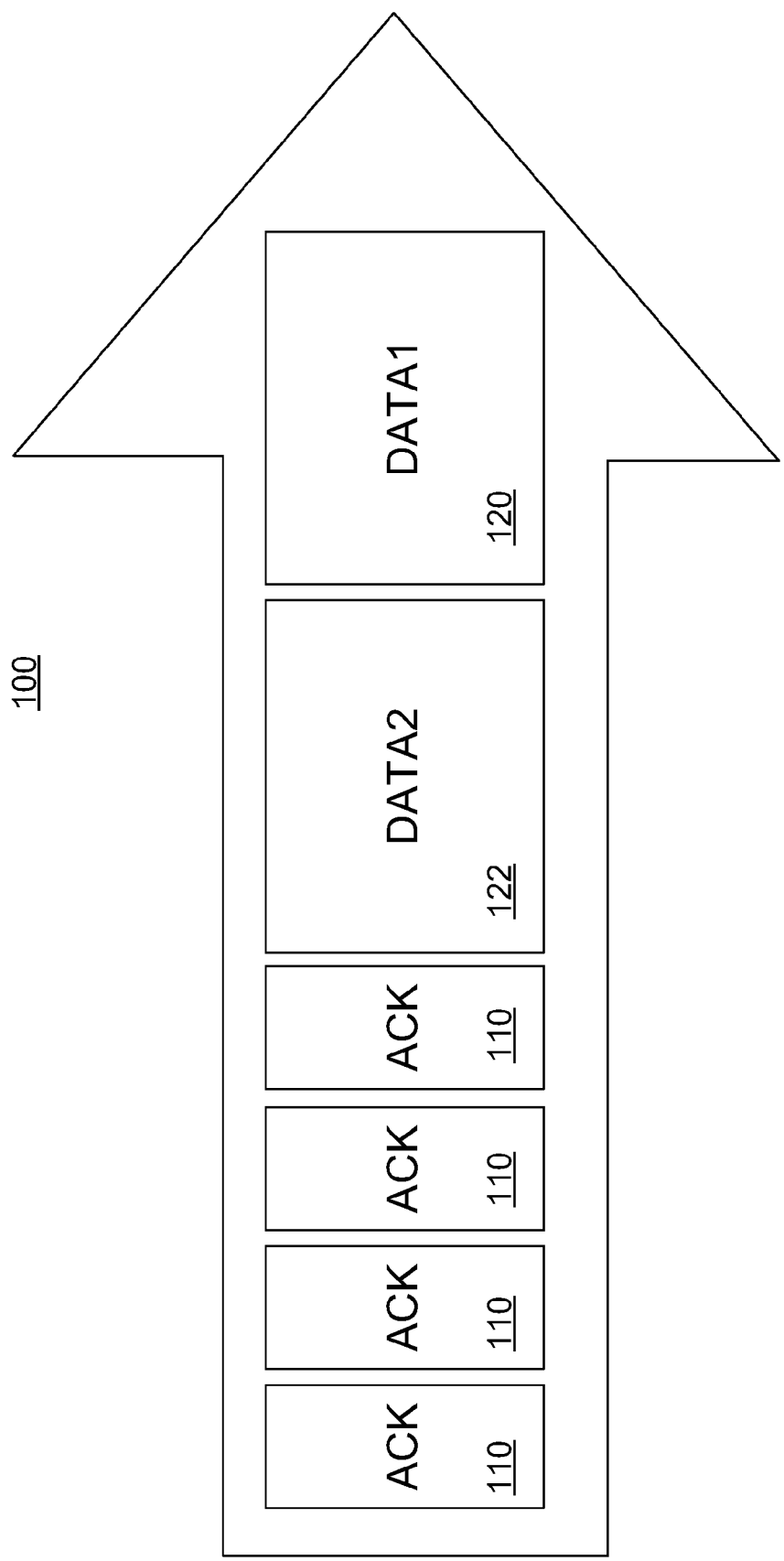
FIG. 1 is a schematic illustration of a conventional traffic management system.

Referring to FIG. 1, a conventional traffic management system 100 is schematically illustrated. In the illustrated system, a first-in-first-out operation of data flow is utilized. In TCP type connections, acknowledgement packets 110 are data packets which are provided once a transaction (e.g., download) is completed or one or more datagrams sent have been received. These acknowledgements are added to the queue in the order in which they are received. Thus, uploads, such as DATA1 120 and DATA2 122, which are in the queue ahead of the acknowledgement packets 110, need to be completed prior to processing of the acknowledgement packets 110. Thus the flow of traffic through the system is stalled since no more data may be sent until the acknowledgements are received. In some cases, the system may time out, which further increases latency within the system.

The acknowledgement packets 110, once received, require little time to process, or acknowledge, a transaction in comparison to the time to process (e.g., upload) most data packets, such as DATA1 120 and DATA2 122. Once an upload or download reaches the front of the queue of data packets and is processed, it is removed from the queue, and the queue is updated.

Figure 2:
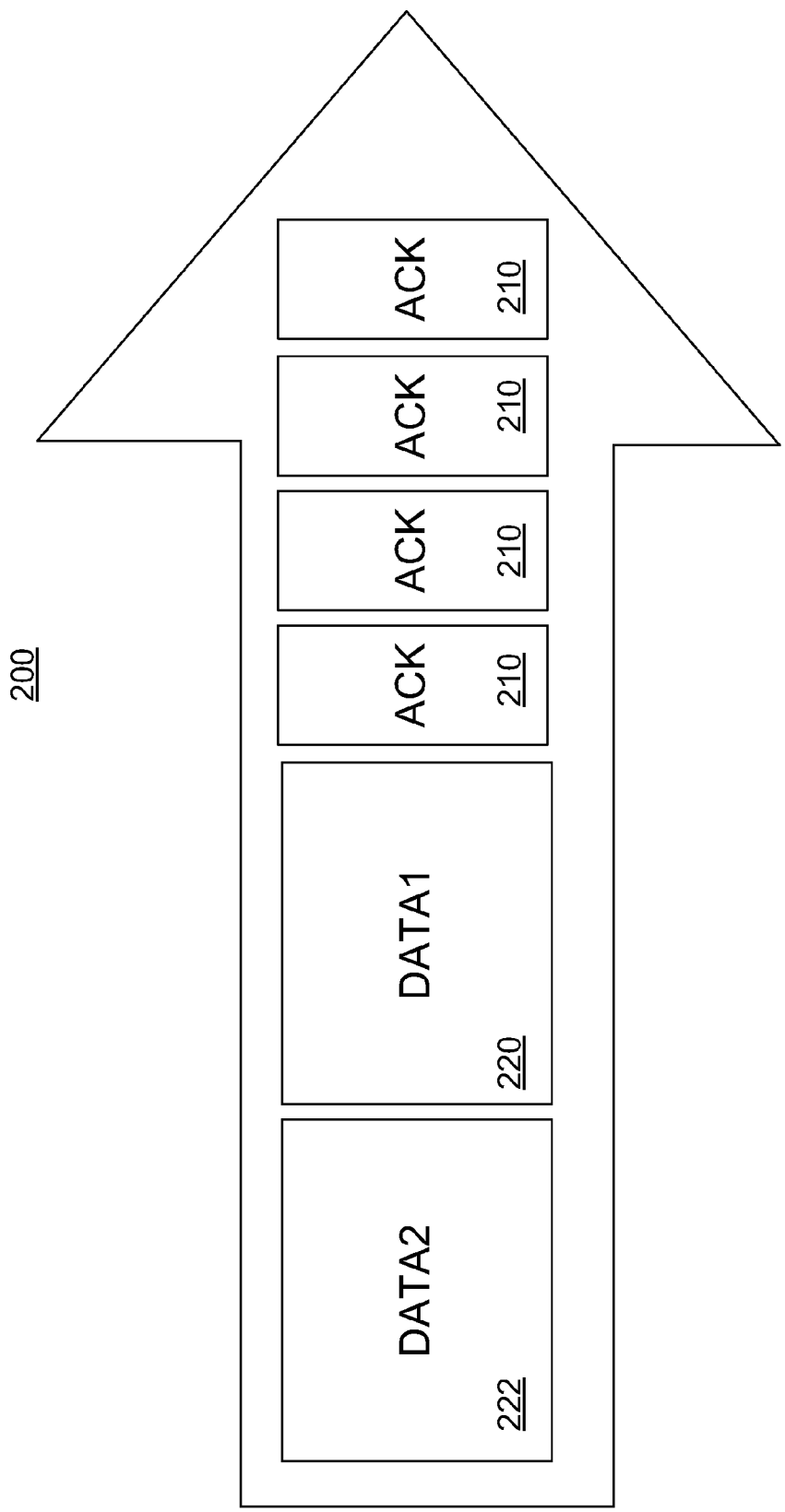
FIG. 2 is a schematic illustration of a traffic management system in accordance with an embodiment of the present invention.

Referring now to FIG. 2, a schematic illustration of a traffic management system in accordance with an embodiment of the present invention is illustrated. In accordance with embodiments of the present invention, a device, such as a network controller, modem or router, maintains a list of available Transmission Control Protocol (TCP) connections, streams of data, or User Datagram Protocol (UDP) sessions, for example. Each such session or connection may include a queue of data packets which becomes a part of an overall queue, as illustrated in FIG. 2. The transport protocol may be any type of layer 4 or similar protocol, for example. Some connections, such as TCP connections, may be any reliable stream buffered connection and may require sending acknowledgements to the sender upon reception of a message or data (or completion of a transaction) by the receiver. In this regard, each data packet, such as DATA1 220, DATA2 222 and the acknowledgements packets 210, may be accounted for from a connection or session providing data to buffered streams.

In accordance with embodiments of the present invention, each connection, session or data packet (also referred to collectively herein as "bandwidth requests") may be associated with a weighted value, or debt. The debt associated with a bandwidth request may be dependent on various factors, such as the bandwidth required and/or the size of the bandwidth request. In one embodiment, a bandwidth request requiring a large bandwidth may be associated with a greater debt, while one requiring less bandwidth may be associated with lower debt.

In accordance with embodiments of the present invention, the debt associated with a bandwidth request may affect the position of the bandwidth request in the queue. In this regard, embodiments of the present invention prioritize bandwidth request based, at least partly, on the associated debt. In some embodiments, the prioritization allows for faster moving traffic to go the front of the queue. For example, more frugal users of bandwidth, such as those sending smaller packets (e.g., less than about 40 bytes) with less frequency, are associated with a smaller debt and are, therefore, given a higher priority. By contrast, a heavy user, such as one sending larger packets (e.g., greater than about 1500 bytes) more frequently, such as sending email, are associated with a larger debt and are, given lower priority.

Thus, in various embodiments, the overall queue may include bandwidth requests of varying sizes, frequencies and other characteristics from one or more connections or sessions.

In accordance with embodiments of the present invention, when a bandwidth request associated with a TCP connection is received, it is processed for positioning in the queue. In this regard, the bandwidth request may be assigned a weight, or debt, based on, for example the bandwidth usage and/or size. In accordance with one embodiment of the present invention, the debt associated with a bandwidth request may be calculated by dividing the size of a packet for the bandwidth request by a priority strength coefficient. The resulting debt for the bandwidth request (e.g., packet) is added to the debt for the connection (e.g., TCP).

Next, the debt associated with the TCP connection associated with the bandwidth request is compared with the debt associated with other connections. Priority may then be assigned to each connection based on the debt for the connections. In this regard, the connections with the lower debt are assigned a higher priority.

Thus, in accordance with embodiments of the present invention, all outgoing traffic is monitored and appropriately tagged, and routing information for all TCP/IP connections is maintained. A debt system can be established to balance load across multiple TCP connections. When an IP packet is ready to be transmitted, it is grouped into certain transport level TCP streams, and a debt is calculated for that stream based on the size of the outgoing packet. In general, if the stream has more outgoing traffic (larger packet size), the larger its debt will be, thus disadvantaging packets from this stream as compared to others. In this regard, such bandwidth estimation facilitates load balance of the streams without any one stream being starved and, at the same time, ensuring that smaller packets (e.g., acknowledgment packets) make it up to the front of the queue to be transmitted.

An example embodiment of the present invention is illustrated as follows. The point in the queue at which a packet sits is referred to as the "skip count." The skip count is a function of packet debt and the priority strength coefficient (also referred to as "skipping_factor"). In one embodiment, the current skip count may be determined by the following formula:

SkipCount=[(current queue count)*(current packet route debt)*(skipping_factor)/(max debt among all routes)]/256

The skipping_factor (or the priority strength coefficient) is an indication of the aggressiveness of the prioritization. In one embodiment, the skipping_factor has a value ranging from 0 to 255. In one embodiment, the skipping_factor is set to a value of 16.

As an example of a debt scenario, when a packet is to be inserted in the uplink queue, the debt value of the new packet's connection is compared to the debt value of all current connections in the queue. The new packet is inserted in the queue at a position behind all other packets of all other connections with a lower debt. For example, if a new packet of size 500 bytes needs to be inserted in the queue, the debt for the new packet's connection is first calculated. For example, the size (500 bytes) may be divided by the priority strength coefficient (e.g., 256) to yield a debt of 2. If the connection for this packet already has a preexisting debt (due to previous packets uploaded) of 12, the new debt is 14. If there are two other connections with packets currently in the queue with a debt of 8 (connection A) and a debt of 20 (connection B), the new packet is inserted behind all packets of connection A with a debt of 8.

In various embodiments, the debt of each connection may be decreased by a predetermined amount on a periodic basis. The predetermined amount of the decrease and the periodicity may be configurable and may be equal for all connections. Further, the predetermined amount of the decrease and the periodicity may change dynamically depending on the conditions present within the system, such as current uplink throughput, received signal strength indication (RSSI) and the base technology of the system. This periodic decrease ensures that connections with a high debt, such as those which require large uploads, are provided an opportunity to upload and are not starved of upload usage. Thus, periodically, the debt of all streams is normalized so that the debt stays within required limits.

The priority strength coefficient (or skipping_factor) may also be configurable and may change dynamically depending on the conditions present within the system, such as current uplink throughput, received signal strength indication (RSSI) and the base technology of the system.

In accordance with embodiments of the present invention, firmware of a router or a modem may maintain and updates a listing of current TCP and UDP established connections of the system and queue. When a new connection is established, it is ranked by debt and added to the list. Connections may be removed from the list when the connection is closed or if the stream of data is sent and the acknowledgement is provided. In addition, the connection may be removed if a timeout occurs.

Thus, in accordance with embodiments of the present invention, with the smaller uplink traffic being prioritized, more downlink traffic is likely to be generated as the download acknowledgements are prioritized and pushed through the system at a faster rate. Downloading may continue while longer uploads are processed through the queue and begin, because acknowledgements are not remaining at the end of the queue and only take a short time for processing. Once the more frugal user have their data packets pushed through the line at a quicker rate, more traffic may be processed, creating a more consistent and constant throughput of larger amounts of data without delay. In addition, in order to maintain consistency within the system and allow for heavier users to not experience an increased delay in usage, each TCP connection is periodically given a break.

Figure 3A:
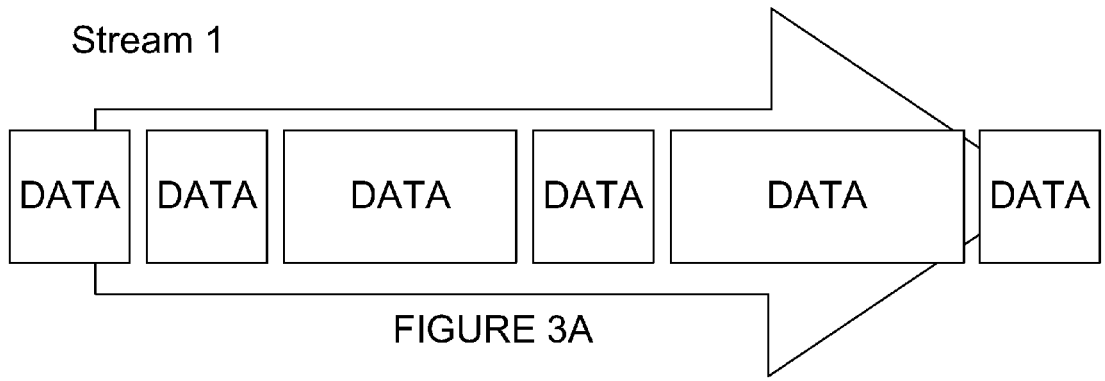
FIGS. 3A-3C are schematic illustrations of exemplary data streams in accordance with an embodiment of the present invention.
Figure 3B:
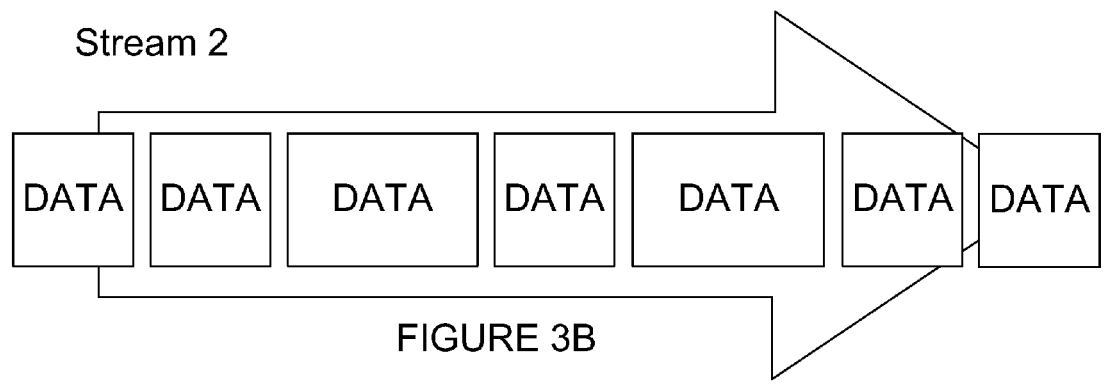
Figure 3C:
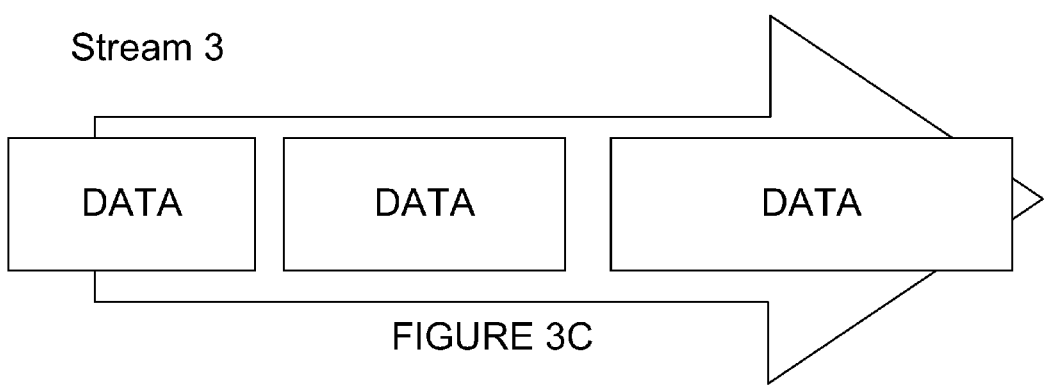

As noted above, a delay in upload speed may occur due to the lower ranking debt of a specific connection. However, only a slight delay (e.g., <5 seconds) will occur in the already slower upload process, while an increasing rise will occur in the downloads being processed through the queue. The benefits of the above-described prioritization are particular apparent in increasing uploads and traffic, The method of debt assignment to the data packets provides that some smaller packets are still located at the end of the queue, while others are in the front. This may be the result of the debt reduction that just occurred or the overall lower debt of the connection stream as a whole. As illustrated in FIGS. 3A-3C, each stream of data originating from a different connection may entail different types of data located within each. For example, FIG. 3A illustrates a connection with a stream that provides neither extreme amounts of large data nor small data. Thus, this stream may be associated with a centrally weighted debt within the listing. Further, FIG. 3B illustrates a stream which may be given a lower overall debt as large amounts of data are not provided. Thus, this stream may be given more bandwidth to increase its throughput. FIG. 3C illustrates a stream associated with a heavier user, for example, where large amounts of upload data are constantly required throughout the stream. This type of connection would be associated with a higher debt in the queue.

One embodiment of the present invention may be implemented within a WWAN modem and/or WWAN router.

Testing has been performed in marginal, mobile and good coverage environments. Files were uploaded and/or downloaded (depending on the test) from a Novatel FTP server. Each test was performed 10 times and averages found. Testing was performed on a Sprint MC727 on the EVDO Rev A network in San Diego, Calif. Each test was performed with production firmware and modified "Network Accelerator" firmware so that a comparison could be made.

In each environment, four result pairs (production and NA firmware) can be found:

1. Download speed (while downloading only)
2. Upload speed (while uploading only)
3. Download speed (while concurrently downloading and uploading)
4. Upload speed (while concurrently downloading and uploading).

Results for a marginal environment are provided below in Table 1.

TABLE 1

| Marginal Coverage | | | |
|---|---|---|---|
| Test | Production Firmware (Kbps) | With Network Accelerator (Kbps) | % Delta |
| Download | 185 | 230 | 124% |
| Upload | 213 | 264 | 124% |
| Download (while uploading) | 40 | 175 | 438% |
| Upload (while downloading) | 297 | 348 | 117% |

In a marginal coverage environment, improved download speed is achieved while uploading. Both the download and upload speeds dramatically increase to well over 100% speeds, based on prior art methods. The usage of both download and upload, provides over quadruple the output.

Results for a mobile environment are provided below in Table 2.

TABLE 2

Mobile Conditions

| Test | Production Firmware (Kbps) | With network Accelerator (Kbps) | % Delta |
|---|---|---|---|
| Download | 264 | 257 | 97% |
| Upload | 124 | 151 | 122% |
| Download (while uploading) | 67 | 168 | 251% |
| Uploading (while downloading) | 109 | 122 | 112% |

Again, improved download speed while uploading ha been observed. The results illustrate substantial downloading capabilities while uploading. In addition to an increased reverse link, or uplink, buffer size, additional processing, RAM and refresh firmware may be included within the device.

Results for a good environment are provided below in Table 3.

TABLE 3

Good Coverage

| Test Case | Production Firmware (Kbps) | With Network Accelerator (Kbps) | % Delta |
|---|---|---|---|
| Download | 816 | 795 | 97% |
| Upload | 88 | 86 | 98% |
| Download (while uploading) | 87 | 270 | 310% |
| Upload (while downloading) | 66 | 81 | 122% |

Once again, a dramatic increase in download speed while uploading is observed. This is due to the fact that the uplink buffer size was greatly increased and with a larger, more consistent queue with a higher generation of downloads, overall throughput is greatly increased.

Thus, in one embodiment of the present invention, a debt algorithm:

increases reverse link buffer size
inspects all packet sizes for each stream
assigns larger packets a larger debt
rewards bandwidth to a stream with lower debt.

Embodiments of the present invention provide substantial advantages, including the following:

up to 4× gain in reverse link download performance when there is upload traffic, and overall better performance on throughput possibly due to larger reverse link buffers.

Figure 4:
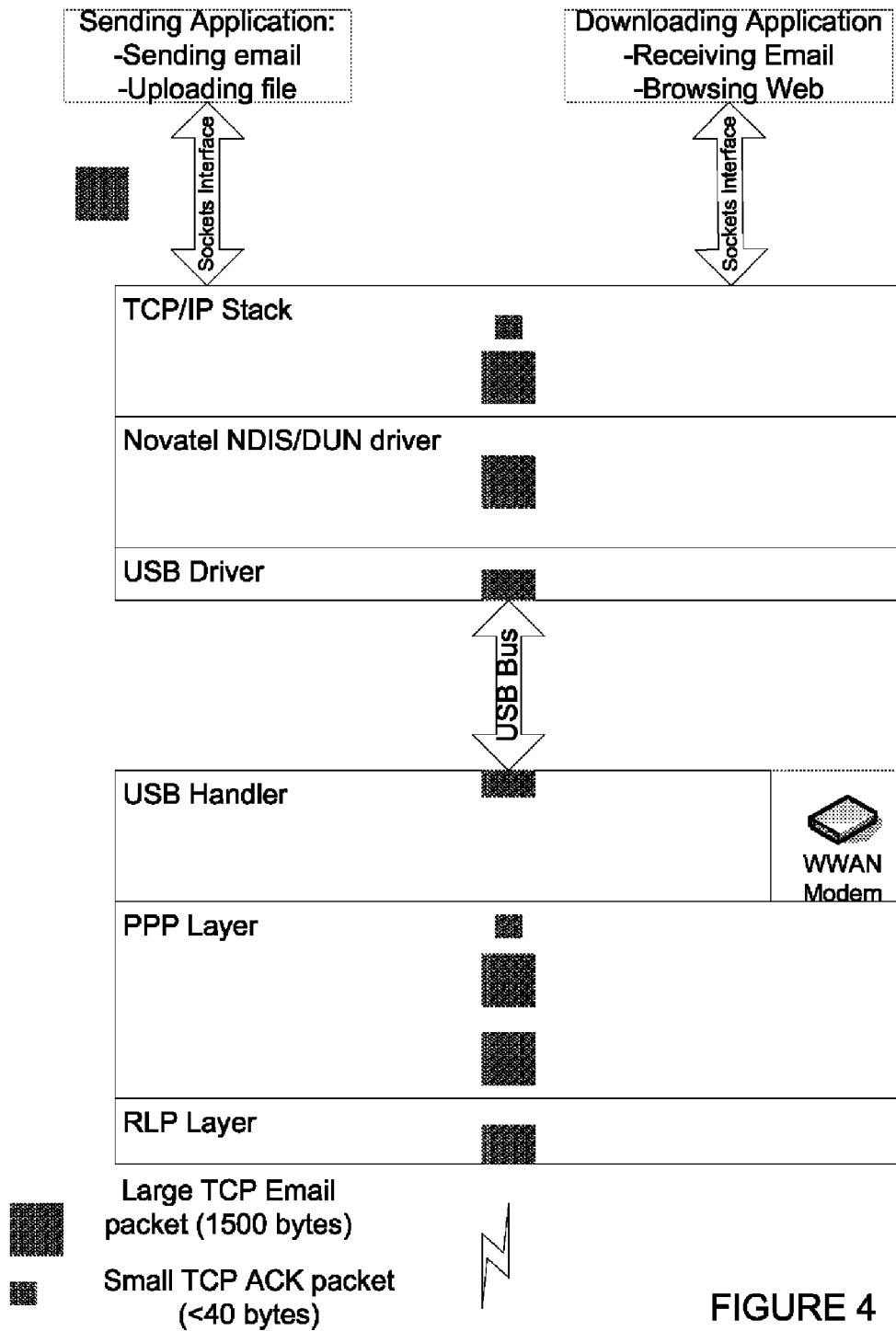
FIG. 4 is a schematic illustration of an exemplary implementation of an embodiment of the present invention.

FIG. 4 illustrates an exemplary view of an embodiment of the present invention within a WWAN modem. In the illustrated embodiment, the sending application, such as uploading a file or sending an email, enters the TCP/IP stack through a socket interface simultaneous to the downloading application, such as receiving email or browsing the web. Once in the TCP/IP stack, when the sending or uploading occurs, the data packets associated the connection are weighted (e.g., associated with a debt). The driver then appropriately places the smaller, less weighted uplink traffic and the acknowledgement packets to be prioritized. Thus, more downlink traffic is likely to be generated and pushed through the system at a faster rate.

Downloading may continue while longer uploads are processed through the queue and begin, because these acknowledgements are not remaining at the end of the queue and only take a short time for processing. Once the more frugal user have their data packets pushed through the line at a quicker rate, more traffic in general may be generated, creating a more consistent and constant throughput of larger amounts of data without delay.

Thus, embodiments of the present invention provide a modified Network Accelerator firmware shows a distinct improvement b download speed while uploading. Downloads in this scenario are about 3 to 4 times faster than current production code. Also, the modified firmware appears to offer better performance, in general, although this improvement is marginal and could be a result of variability in the testing environment.

Various embodiments described herein are described in the general context of method steps or processes, which may be implemented in a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Embodiments of the present invention may be implemented in software, hardware, application logic or a combination of software, hardware and application logic.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A method for management of Internet Protocol (IP) traffic, comprising:
    (a) receiving an uplink data packet associated with a connection of a plurality of connections;
    (b) assigning a weight to the uplink data packet based on a priority strength coefficient indicative of the aggressiveness of prioritization of the plurality of connections;
    (c) updating a debt associated with the connection based on the weight assigned to the uplink data packet;
    (d) prioritizing the connections based on the debt associated with each of the one or more connections, such that a skip count, indicative of packet priority, is determined as:

Skip Count=[(current queue count)*(current packet route debt)*(priority strength coefficient)/(max debt amount all routes)]/256; and (e) processing packets in the one or more connections based on the prioritizing.

2. A device, comprising:
   a processor; and
   a memory unit communicatively connected to the processor and including:
    (a) computer code for receiving an uplink data packet associated with a connection of a plurality of connections;
    (b) computer code for assigning a weight to the uplink data packet based on a priority strength coefficient that is indicative of the aggressiveness of prioritization of the plurality of connections;

(c) computer code for updating a debt associated with the connection based on the weight assigned to the uplink data packet;

(d) computer code for prioritizing the connections based on the debt associated with each of the one or more connections and for determining a skip count, indicative of packet priority, as:

Skip Count=[(current queue count)*(current packet route debt)*(priority strength coefficient)/(max debt amount all routes)]/256; and (e) computer code for processing packets in the one or more connections based on the prioritizing.

3. A computer program product, embodied on a non-transitory computer-readable medium, comprising:

(a) computer code for receiving an uplink data packet associated with a connection of a plurality of connections;

(b) computer code for assigning a weight to the uplink data packet based on a priority strength coefficient that is indicative of the aggressiveness of prioritization of the plurality of connections;

(c) computer code for updating a debt associated with the connection based on the weight assigned to the uplink data packet;

(d) computer code for prioritizing the connections based on the debt associated with each of the one or more connections and for determining a skip count, indicative of packet priority, as:

Skip Count=[(current queue count)*(current packet route debt)*(priority strength coefficient)/(max debt amount all routes)]/256; and (e) computer code for processing packets in the one or more connections based on the prioritizing.

* * * * *